United States Patent [19]

Huard

[11] Patent Number: 4,974,892
[45] Date of Patent: Dec. 4, 1990

[54] PROTECTIVE AUTOMOTIVE GUARD

[76] Inventor: Clair A. Huard, 14723 Red Hill Ave., Tustin, Calif. 92680

[21] Appl. No.: 383,521

[22] Filed: Jul. 24, 1989

[51] Int. Cl.$^5$ ............................................. B60R 13/04
[52] U.S. Cl. .................................... 293/128; 280/770
[58] Field of Search ................... 293/128, 1, 102, 120,
293/126, 135, 136, 137, 146; 296/136; 340/436,
94, 943; 280/429, 770

[56] References Cited

U.S. PATENT DOCUMENTS

| | | | |
|---|---|---|---|
| 3,237,964 | 3/1966 | Doyle | 293/128 X |
| 3,388,523 | 6/1968 | Evans | 293/128 X |
| 3,704,037 | 11/1972 | Glassberg | 293/1 X |
| 3,752,521 | 8/1973 | Lafebre | 293/128 |
| 4,014,583 | 3/1977 | Forbes | 293/128 |
| 4,127,294 | 11/1978 | Cooper | 293/128 |
| 4,469,727 | 9/1984 | Loew | 293/128 X |
| 4,668,565 | 5/1987 | Murachi | 296/1 X |
| 4,828,303 | 5/1989 | Soria | 280/770 X |

FOREIGN PATENT DOCUMENTS 2564393  11/1985  France .................. 293/128

Primary Examiner—Dennis H. Pedder
Attorney, Agent, or Firm—Leon Gilden

[57] ABSTRACT

A protective automotive guard is set forth for securement to an automotive door panel and the like for protection against impact from adjacent vehicles. The guard includes a matrix of rods securable to the door utilizing various devices, such as magnetic tape, double faced tape, and suction cups. A further embodiment of the device utilizes removable rods for replacement subsequent to their damage. A third embodiment of the device includes an alarm for alerting an adjacent vehicle of impact with the automotive guard.

4 Claims, 4 Drawing Sheets

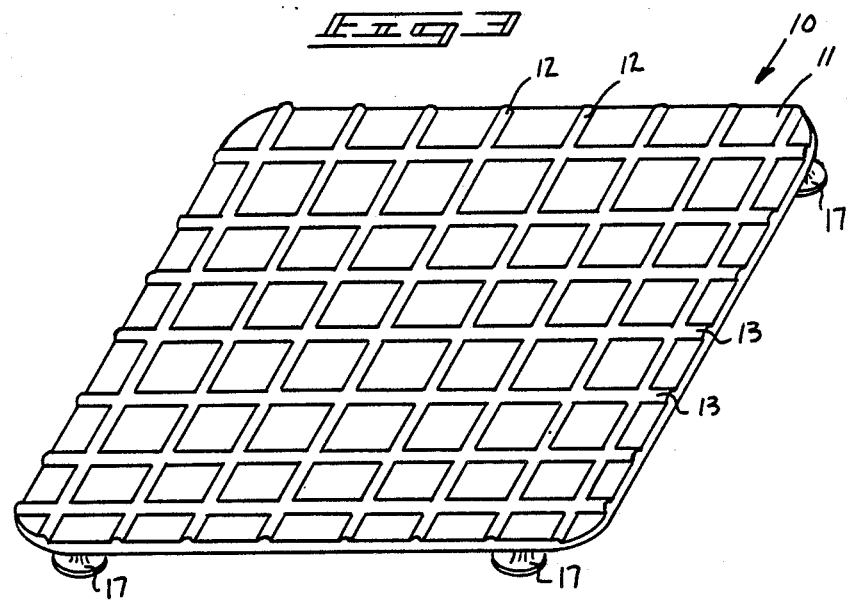
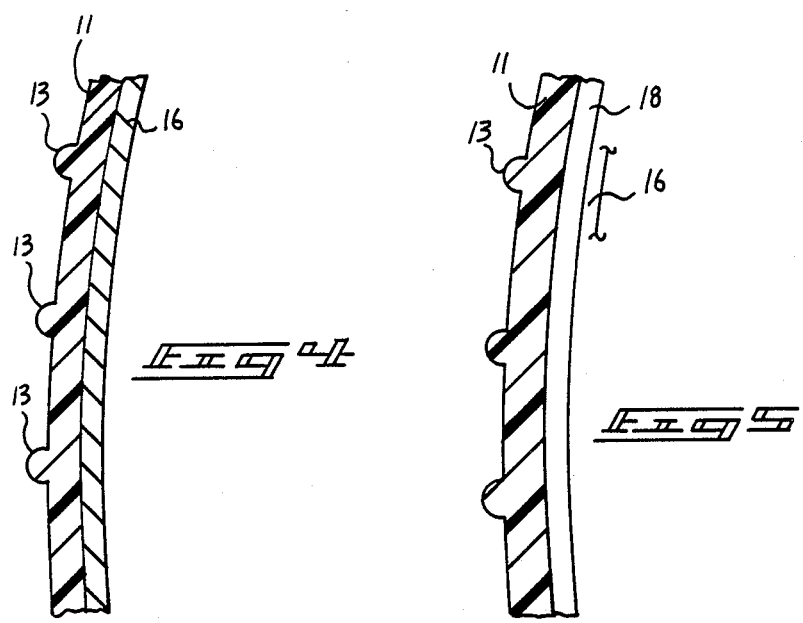

PROTECTIVE AUTOMOTIVE GUARD

BACKGROUND OF THE INVENTION

1. Field of the Invention

The field of invention relates to automotive guard devices, and more particularly pertains to a new and improved protective automotive guard wherein the same is securable overlying a door panel and the like of a vehicle to protect that vehicle from unnecessary damage due to impact from adjacent vehicles.

2. Description of the Prior Art

The use of protective automotive panels overlying doors of a vehicle is known in the prior art. Various devices have been utilized for securement to the door, such as resilient strips and temporary panels suspended relative to the door frame for protecting the door and minimizing costly damage due to unnecessary repairs from impact of adjacent vehicles such as in parking lots and the like. Examples of the prior art include U.S. Pat. No. 4,398,758 to Tabares wherein a series of plates are aligned relative to one another overlying the door utilizing magnetic means for securement of the plates to the door panels.

U.S. Pat. No. 4,708,380 to Cruz provides elongate strips of semi-rigid material securable overlying the door and further including a securement strap coupled to the end of a strip for securement of the device interiorly of the vehicle.

U.S. Pat. No. 4,707,008 to Flaco provides a molded protective side panel utilizing suction cups for securement of the panel to a door of an automotive vehicle.

U.S. Pat. No. 4,750,767 to Barnett utilizes a side protective guard suspended from a top portion of an automotive door with pivoted side panels directed outwardly for protecting of the side portion of the vehicle during a parking situation.

U.S. Pat. No. 4,796,935 to Maraia provides a protective side bumper strip utilizing an elongate elastic belt removably attached to the door and adjustable to accommodate various configurations of automobiles.

As such, it may be appreciated that there is a continuing need for a new and improved protective automotive guard as set forth by the instant invention to overcome the problems of effectiveness in construction and ease of use, and in this respect the present invention substantially fulfills this need.

SUMMARY OF THE INVENTION

In view of the foregoing disadvantages inherent in the known types of protective automotive guards now present in the prior art, the present invention provides a protective automotive guard utilizing a polymeric grid of bumper strips for protecting an expansive area of a side portion of a vehicle. As such, the general purpose of the present invention, which will be described subsequently in greater detail, is to provide a new and improved protective automotive guard which has all the advantages of the prior art protective automotive guards and none of the disadvantages.

To attain this, the present invention includes a support base of a generally rectangular configuration formed with included and integrally formed vertical and horizontal ribs. The guard is secured to a vehicle by use of magnetic tape, suction cups, or doubled backed adhesive tape. A further embodiment of the instant invention includes grooves defining arcs of greater than 180 degrees to enable replacement of flexible rods of a length coextensive with a flexible base member. A third embodiment of the instant invention includes a base member, including an alarm, wherein an elongate "U" shaped channel includes a rigid rod arranged for depressing a medially positioned switch button with an included battery completing a circuit with an audible alarm upon depressing of the rigid switch within a "U" shaped channel defined within the base portion.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved protective automotive guard which has all the advantages of the prior art protective automotive guards and none of the disadvantages.

It is another object of the present invention to provide a new and improved protective automotive guard which may be easily and efficiently manufactured and marketed.

It is a further object of the present invention to provide a new and improved protective automotive guard which is of a durable and reliable construction.

An even further object of the present invention is to provide a new and improved protective automotive guard which is susceptible of a low cost of manufacture with regard to both materials and labor, and which accordingly is then susceptible of low prices of sale to the consuming public, thereby making such protective automotive guards economically available to the buying public.

Still yet another object of the present invention is to provide a new and improved protective automotive guard which provides in the apparatuses and methods of the prior art some of the advantages thereof, while simultaneously overcoming some of the disadvantages normally associated therewith.

Still another object of the present invention is to provide a new and improved protective automotive guard wherein the same provides a rectangular mat-like configuration overlying selective portions of side panels of an automotive vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a further embodiment of the instant invention.

FIG. 4 is an orthographic view taken along the lines 4—4 of FIG. 2 in the direction indicated by the arrows.

FIG. 5 is an orthographic cross-sectional view of a modification of the instant invention utilizing double backed tape for securement of the device to a door panel.

DESCRIPTION OF THE PREFERRED EMBODIMENT

Figure 1:
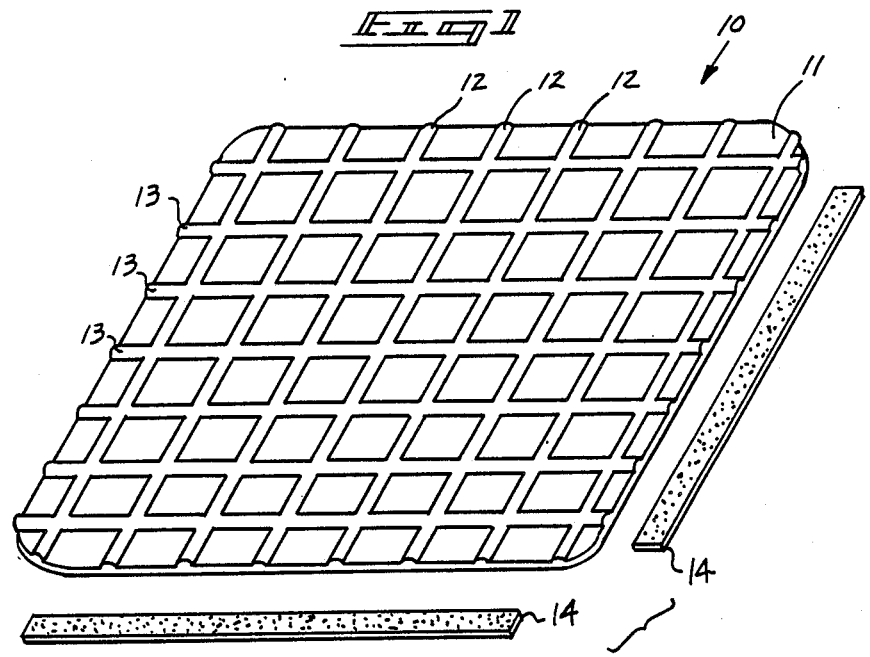
FIG. 1 is an isometric illustration of the instant invention.
Figure 2:
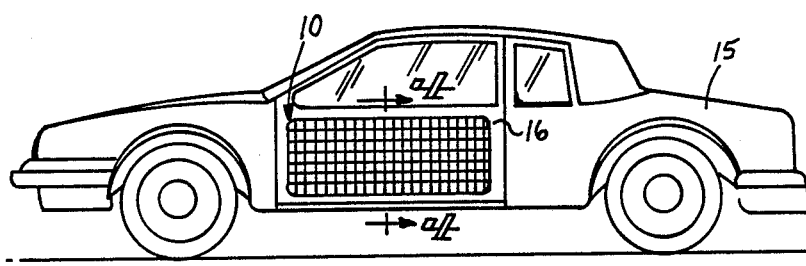
FIG. 2 is an orthographic view taken in elevation of the instant invention secured to a side portion of an automobile.

With reference now to the drawings, and in particular to FIGS. 1 to 9 thereof, a new and improved protective automotive guard embodying the principles and concepts of the present invention and generally designated by the reference numerals 10, 19, and 23 will be described.

More specifically, the protective automotive guard 10 of the instant invention essentially comprises a support base 11 including upstanding vertical ribs 12 and horizontal ribs 13 orthogonally directed relative to one another, wherein the base and ribs are formed of a flexible polymeric material to accommodate various contours of an exterior portion of an automobile. Magnetic tape strips 14 are adherably secured to side edges of rear edges of the support base 11 with the magnetic constituent positioned in association with a vehicular door 16 of an associated automotive vehicle 15.

FIG. 3 is illustrative of the device of FIG. 10 utilizing utilizing suction cups 17 positioned adjacent corners of the rectangular support base 11 on a rear surface thereof. FIG. 5 is illustrative of the base 11 utilizing double backed adhesive tape 18 to secure the support base to an associated vehicular door.

Figure 6:
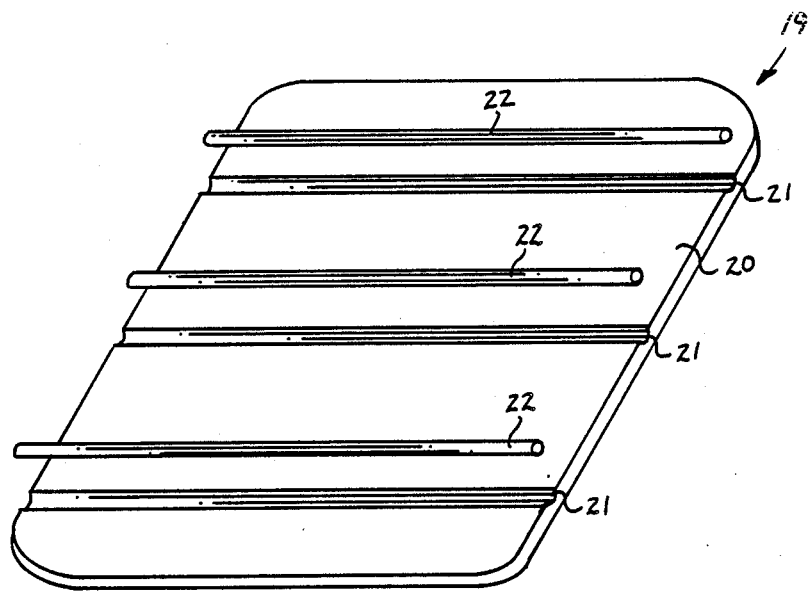
FIG. 6 is an isometric illustration of a third embodiment of the instant invention.
Figure 7:
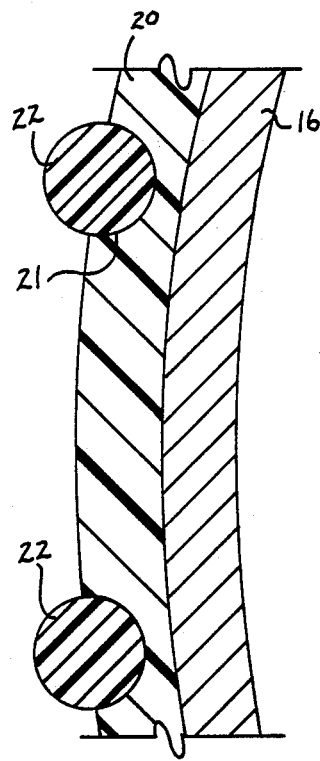
FIG. 7 is a cross-sectional view of the embodiment as set forth in FIG. 6.

FIG. 6 is illustrative of an embodiment of the instant invention utilizing a flexible support base 20 wherein coextensive horizontal grooves 21 are formed parallel to one another within an upper surface of the base 20. The grooves 21 define a cross-sectional arc greater than 180 degrees wherein flexible rods 22 of a length equal to and coextensive with the grooves 21 are secured within the grooves 21 and are slidably mounted therein for replacement upon excessive wear of the rods 22. The rods 22 accordingly may be formed of a more flexible polymeric material than the base 21 subjecting such rods to accelerated surface disfigurement and erosion.

Figure 8:
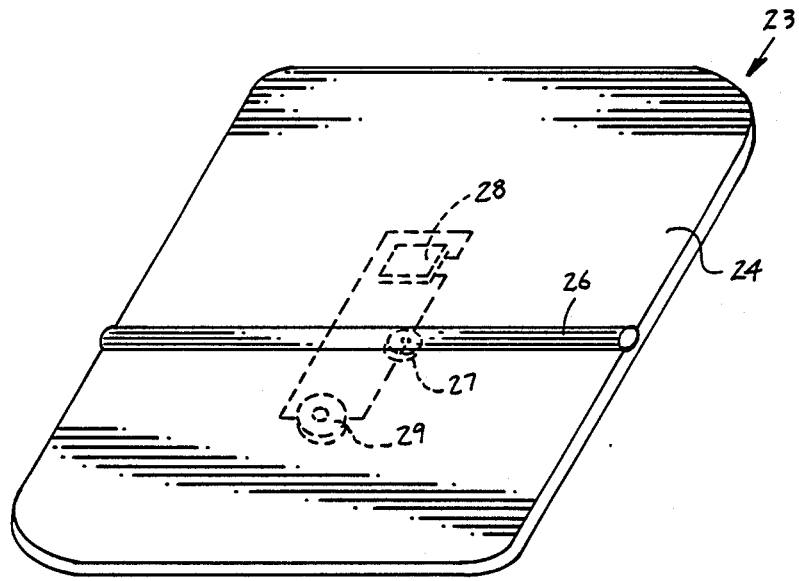
FIG. 8 is an isometric illustration of a fourth embodiment of the instant invention.
Figure 9:
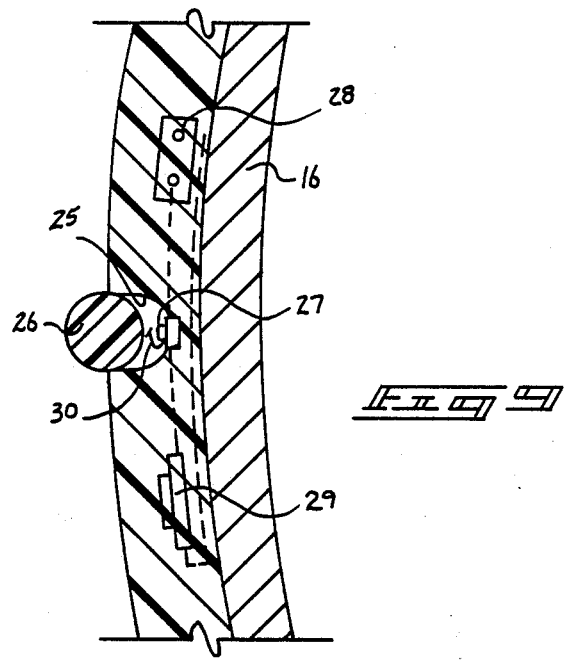
FIG. 9 is a cross-sectional view of the embodiment of FIG. 8 illustrating the internal portions thereof.

FIG. 8 is illustrative of a further embodiment of the instant invention wherein the flexible polymeric base 24 is provided with a "U" shaped channel 25 for reciprocatably mounting a rigid rod 26 therein. The "U" shaped channel 25 defines a height less than the diameter of the rod 26 but of a height greater than the radius of the rod 26 with a plurality of biasing springs 30 to maintain the rod 26 at an entrance to the channel 25, which is of a width less than the diameter of the rod 26 to prevent the rod 26 from displacement from the channel. Upon an adjacent car door opening and coming in contact with the rigid rod 26, it will be directed interiorly of the channel 25 where it will contact a depressible switch button 27. A circuit will then be completed including a battery 28 and an audible alarm 29 joined in series with the switch 27 to effect actuation of the alarm 29 which may include a buzzer, a bell, and the like to alert an adjacent vehicle of its impingement upon the guard 23.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A protective automotive guard for selective attachment to a side portion of a vehicle, comprising,
 a flexible planar, rectangular base member including
   arcuate rib means coextensive with the base member and directed outwardly of the outer surface of the base member, and
 securement means selectively securable to an interior surface of the base member spaced from the outer surface for securement of the base member to the side portion of the vehicle, and
 wherein the rib means includes a plurality of spaced parallel vertical rib means orthogonally oriented relative to a plurality of spaced parallel horizontal rib means.

2. A protective automotive guard as set forth in claim 1 wherein the securement means includes magnetic strips adherably securable to the interior surface of the base member.

3. A protective automotive guard as set forth in claim 1 wherein the securement means include suction cups secured adjacent corners of the rectangular base member on the interior surface of the base member.

4. A protective automotive guard as set forth in claim 1 wherein the securement means define double backed adhesive tape for adhesive securement to the base member and to the side portion of the vehicle.

* * * * *